US008191357B2

(12) United States Patent
Döring et al.

(10) Patent No.: US 8,191,357 B2
(45) Date of Patent: Jun. 5, 2012

(54) METHOD FOR ADJUSTING THE METERED ADDITIONS OF REDUCING AGENT FOR SELECTIVE CATALYTIC REDUCTION

(75) Inventors: Andreas Döring, München (DE); Florian Walde, Dietenhofen (DE); Jochen Philipp, Uttenreuth (DE); Henry Munitzk, Heroldsberg (DE); Ralf Steinert, Nürnberg (DE)

(73) Assignee: Man Truck & Bus AG, München (DE)

( * ) Notice: Subject to any disclaimer, the term of this patent is extended or adjusted under 35 U.S.C. 154(b) by 278 days.

(21) Appl. No.: 12/719,506

(22) Filed: Mar. 8, 2010

(65) Prior Publication Data

US 2010/0223914 A1    Sep. 9, 2010

(30) Foreign Application Priority Data

Mar. 6, 2009   (DE) .................. 10 2009 012 093

(51) Int. Cl.
*F01N 3/00* (2006.01)
*F01N 3/10* (2006.01)
(52) U.S. Cl. ................ 60/286; 60/299; 60/303
(58) Field of Classification Search ............. 60/286
See application file for complete search history.

(56) References Cited

U.S. PATENT DOCUMENTS

| 6,092,367 A | 7/2000 | Dolling |
| 6,119,448 A | 9/2000 | Emmerling et al. |
| 7,452,724 B2 * | 11/2008 | Wickert ................... 436/55 |
| 2004/0055284 A1 | 3/2004 | Ripper et al. |
| 2004/0098974 A1 | 5/2004 | Nieuwstadt et al. |
| 2004/0098978 A1 | 5/2004 | Tarabulski et al. |
| 2006/0000202 A1 | 1/2006 | Ripper et al. |
| 2006/0096278 A1 | 5/2006 | Lueders et al. |
| 2009/0025370 A1 * | 1/2009 | Kondo et al. ............ 60/286 |

FOREIGN PATENT DOCUMENTS

| DE | 34 28 232 | 2/1986 |
| DE | 43 15 278 | 11/1994 |
| DE | 195 36 571 | 4/1997 |
| DE | 199 06 344 | 8/2000 |
| DE | 101 00 420 | 1/2001 |
| DE | 10 2008 017 543 | 10/2008 |
| EP | 898 061 | 2/1999 |

* cited by examiner

*Primary Examiner* — Thomas Denion
*Assistant Examiner* — Jason Shanske
(74) *Attorney, Agent, or Firm* — Cozen O'Connor

(57) ABSTRACT

A method for use in conjunction with an exhaust gas post-treatment system for metering an ammonia-releasing reducing agent into the exhaust gas stream of an internal combustion engine installed in a motor vehicle and operating with excess air. A control unit meters the quantity of reducing agent as a function of a stored model and, during the operation of the internal combustion engine, determines, by comparison of a value proportional to the nominal emission or the nominal conversion stored in the control unit of the internal combustion engine for the associated operating point of the internal combustion engine and/or of the exhaust gas post-treatment system with a value proportional to the actual emission or the actual conversion metrologically determined by the control unit.

11 Claims, No Drawings

METHOD FOR ADJUSTING THE METERED ADDITIONS OF REDUCING AGENT FOR SELECTIVE CATALYTIC REDUCTION

BACKGROUND OF THE INVENTION

1. Field of the Invention

The invention pertains to a method for metering an ammonia-releasing reducing agent into an exhaust gas stream of an internal combustion engine operating with excess air in an exhaust gas post-treatment system.

2. Description of the Related Art

In addition to solid particles, nitrogen oxides are restricted exhaust gas components that form during combustion processes. The permitted levels of these components is continually being lowered. Various methods are in use today to minimize these exhaust gas components in internal combustion engines operated in motor vehicles. Lowering the levels of nitrogen oxides is usually done with catalysts. To raise the selectivity and the $NO_x$ conversion rates, a reducing agent is present in the oxygen-rich exhaust gas.

These approaches have become known under the collective term "SCR method", where SCR stands for "selective catalytic reduction". They have been used for many years in the power plant industry and recently also in internal combustion engines. A detailed description of these methods can be found, for example, in DE 34 28 232 A1. $V_2O_5$-containing mixed oxides such as those in the form of $V_2O_5/WO_3/TiO_2$ can be used as SCR catalysts. The amounts of $V_2O_5$ present are typically in the range of 0.2-3%. The use of iron-containing and/or copper-containing zeolites is also conceivable.

Ammonia or compounds which split off ammonia such as urea or ammonium formate in solid form or in the form of a solution are used as reducing agents in practical applications.

Urea decomposes at high temperatures into isocyanic acid and ammonia:

$$(NH_2)_2CO \Leftrightarrow NH_3 + HNCO \quad (1)$$

The isocyanic acid is hydrolyzed by water in the exhaust gas to $NH_3$ and $CO_2$:

$$HNCO + H_2O \Rightarrow NH_3 + CO_2 \quad (2)$$

Upon complete hydrolysis of one mole of urea, therefore, two moles of ammonia and one mole of carbon dioxide are formed:

$$(NH_2)_2CO + H_2O \Rightarrow 2NH_3 + CO_2 \quad (3)$$

As a result, the hydrolysis of urea provides the same reliable reducing agent as that used in the power plant industry, namely, ammonia.

One mole of ammonia is required to convert one mole of nitrogen monoxide:

$$4NO + 4NH_3 + O_2 \Rightarrow 4N_2 + 6H_2O \quad (4)$$

The ratio of $NH_3$ to $NO_x$ is called the feed ratio $\alpha$.

$$\alpha = NH_3/NO_x$$

In the case of an ideal catalyst, this means that, at a feed ratio of one, all of the nitrogen oxides are reduced; that is, a $NO_x$ conversion of 100% is achieved, because the following is true for the $NO_x$ conversion $X_{NOx}$:

$$X_{NOx} = (c_{NOx,0} - c_{NOx})/c_{NOx,0}$$

where
$c_{NOx,0}$: raw $NO_x$ emissions, ppm, and
$c_{NOx}$: $NO_x$ emissions after the catalyst, ppm.

If, to form $NO_2$, a platinum-containing NO oxidation catalyst is installed upstream of the SCR catalyst:

$$2NO + O_2 \Leftrightarrow 2NO_2 \quad (5)$$

then the SCR reaction can be greatly accelerated, and the low-temperature activity can be significantly increased.

$$NO + 2NH_3 + NO_2 \Rightarrow 2N_2 + 3H_2O \quad (6)$$

Nevertheless, in the presence of $NO_2$, it must also be expected that the emissions of nitrous oxide will also increase according to the following reaction:

$$2NH_3 + 2NO_2 + \tfrac{1}{2}O_2 \Rightarrow 2N_2O + 3H_2O \quad (7)$$

In the case of internal combustion engines operating in motor vehicles it is difficult to use the SCR method to lower the nitrogen oxides, because the operating conditions are always changing. For example, the exhaust gas temperatures, the quantities of exhaust gas, and the raw $NO_x$ emissions are subject to frequent fluctuations. This makes it difficult to add the proper quantities of the reducing agent. On the one hand, the goal is to achieve the highest possible conversion of nitrogen oxides, but at the same time care must be taken not to allow the emission of nitrous oxide, isocyanic acid, or unconsumed ammonia.

To meter the reducing agent for the SCR method in motor vehicles, there are currently two different ways in which the correct metered quantity of reducing agent is determined.

The first is a pure open-loop control method without any feedback for determining the actual emissions downstream of the catalyst system. The metered quantity is determined in this case with the help of models based on data acquired and/or stored in the memory of an electronic engine control device of the internal combustion engine in the form of tables, curves, characteristic diagrams, or functions and possibly with the help of sensors for determining the catalyst temperature and the quantities of $NO_x$ and exhaust gas. The raw emissions of the engine are calculated, for example, from the injected quantity, the engine rpm's, the injection pressure, and fuel/air ratio, etc. The possible $NO_x$ conversions and the metered quantities of reducing agent required to achieve them depend in turn on the catalyst temperature, on the raw $NO_x$ emissions, on the quantity of exhaust gas, etc. The actual emissions downstream of the system are not detected and thus have no effect on the metered quantity (DE 43 15 278 A1, DE 195 36 571 A1, DE 199 06 344 A1, EP 898 061 A1).

The disadvantage of this method is that, because of the absence of feedback concerning the actual emissions, it is almost impossible to compensate for errors, defects, or environmental influences.

The second possibility is a standard closed-loop control circuit with HNCO, $N_2O$, $NO_x$, and/or $NH_3$ sensors downstream of the system. For this purpose, the actual values currently being supplied by the sensors are compared with the nominal values, and the metered quantity is adjusted continuously. Nevertheless, the problem of permanent closed-loop control consists in the inertia of the system and of the sensors and simultaneously in the highly dynamic way in which an internal combustion engine operates in a motor vehicle. For example, during an acceleration process or an increase in the load on an exhaust gas-turbocharged internal combustion engine, the $NO_x$ emissions can rise by a factor of 10 within one second. In the case of naturally aspirated engines, the rise occurs even faster because of the absence of inertia of the exhaust gas turbocharger. The same is also true when loads are shed or on the transition to operation in push mode.

The sensors used to determine the emissions are not able to detect these highly dynamic processes. One of the reasons for this is the inertia of the sensors. The typical t90 time, that is, the time at which 90% of the end value is reached, of these sensors is found in the range of 300-500 ms. Another reason is the necessity to position the sensors behind the catalyst system. Thus the gas transit time from the discharge point from the cylinder head to the discharge point from the catalyst system alone is in the range of 200-2,000 ms, depending on the volume flow rate of the exhaust gas and the volume of the exhaust gas system.

To remedy this problem, an exhaust gas post-treatment system and a method for controlling this exhaust gas post-treatment system of the general type in question, especially for an internal combustion engine, is proposed in DE 101 00 420 A1, which partially solves the problem. A predetermined quantity of reducing agent is supplied to the exhaust gas post-treatment system, which comprises at least one catalyst, as a function of the operating state of the internal combustion engine and/or of the exhaust gas post-treatment system. The quantity of supplied reducing agent is adapted. For this purpose, the discharge of nitrogen oxides or of ammonia is measured by the use of sensors while the internal combustion engine is operating under steady-state conditions, and these measurements are compared with nominal values which have been stored for this steady-state operating condition. If a deviation is found, the control unit of the exhaust gas post-treatment system determines a correction value, by which the supplied quantity of reducing agent is then adjusted, i.e., adapted.

The disadvantage of this system is that, because of the previously described inertia of the system, the adaptation can occur only during a relatively long period of steady-state operating conditions under the given operating parameters of the internal combustion engine. The phase "steady-state operating conditions" means that the operating variables, which determine the metered addition of the reducing agent, may not change or may change to only a minimal extent. Such steady-state operating conditions do not occur for long periods of time during certain types of operation of the internal combustion engine, e.g., when it is operated in a vehicle driven in city traffic. As a result, the quantity of reducing agent cannot be corrected for long periods of time, and therefore increased amounts of pollutants such as nitrogen oxides or ammonia are discharged from the vehicle.

Another approach to solving the problem described above can be found in DE 195 36 571 A1. Here a method and an associated device for metering the input quantity of a reducing agent into the exhaust gas or exhaust air stream of internal combustion systems, especially of internal combustion engines, with a downstream catalyst are described. The setting of the input quantity of the reducing agent is accomplished, based on operation-relevant parameters of the internal combustion system, of the exhaust gas, and of the catalyst by way of characteristic curves (or diagrams), wherein the position of the characteristic curves (or diagrams) is inspected and adjusted to the actual state and to the actual operating conditions of the internal combustion engine, of the exhaust gas, and of the catalyst. What happens therefore, is that the characteristic curves or characteristic diagrams are adapted by comparison of the actual pollutant concentration determined by the sensors with the stored nominal values.

When this approach is used, the considerable inertia of the system, especially of the sensors, again means that an inspection can be conducted only when the internal combustion engine is operating under steady-state conditions, and therefore that the disadvantages described above with respect to DE 101 00 420 A1 are still present here.

SUMMARY OF THE INVENTION

An inventive method according to one embodiment is applied in conjunction with an exhaust gas post-treatment system for metering an ammonia-releasing reducing agent into the exhaust gas stream of an internal combustion engine installed in a motor vehicle and operating with excess air. As usual in such arrangements, the reducing agent is metered by a metering device, which is controlled by a control unit and is assigned to the exhaust gas post-treatment system. To reduce the nitrogen oxides, at least one SCR catalyst, serving as another component of the exhaust gas post-treatment system, is arranged in the exhaust gas stream downstream of the metering device.

The metered quantity of reducing agent, typically an aqueous urea solution, but other reducing agents (ammonia or compounds which split off ammonia such as urea or ammonium formate) are also conceivable, is adjusted by the control unit based on a model, which is stored in the unit and which covers all possible operating points of the internal combustion engine or of the exhaust gas post-treatment system.

In the simplest case, the "model" is a characteristic curve or a characteristic diagram, but it can also be a large number of characteristic curves or of characteristic diagrams, or it can even consist of single or multi-parametric functions, which are determined or defined with the help of a so-called "reference arrangement" and/or on the basis of theoretical considerations. The reference arrangement in the present case is an arrangement, typical for the vehicle model series in question, of an internal combustion engine and an exhaust gas post-treatment system, which can already be installed in a vehicle. On the one hand, a metered quantity of the reducing agent is determined for a large number of operating points of the arrangement by measurements of the reference arrangement and/or on the basis of theoretical considerations, and on the other hand a nominal emission value is determined at each of these operating points. Each operating point is defined by the value of at least one operating parameter of the reference arrangement. The metered quantities obtained and the associated nominal emissions or nominal conversions are kept on hand in the form of a model in the control units of the corresponding vehicle model series in such a way that, from the model, values proportional to the metered quantity and proportional to the nominal emission or nominal conversion can be obtained directly or by interpolation by the control unit for all possible values which the at least one operating parameter can assume, i.e., for all operating points which can occur.

From this model, i.e., from the characteristic curves, characteristic diagrams, or functions, the control unit determines the metered quantity as a function of the at least one operating parameter of the internal combustion engine and/or of the exhaust gas post-treatment system evaluated by the control unit. The instantaneous value of the at least one operating parameter determines the associated operating point of the internal combustion engine and/or of the exhaust gas post-treatment system. In practice, what is involved here is often not just one but rather a large number of operating parameters that have an influence on the correct, metered quantity of reducing agent. Accordingly, this multiple dependence is preferably incorporated into the model.

Because this multiple dependence is not constant but subject to change, especially to changes over time associated with the number of hours of system operation and to changes attributable to environmental influences, the metered quantity determined on the basis of the model must be subjected to a correction. During the operation of the internal combustion engine, the control unit compares a value which has been determined for the internal combustion engine and/or the exhaust gas post-treatment system by the control unit of the internal combustion engine from stored values, namely, a value which is proportional to the nominal emission or to the nominal conversion, with a value which has been metrologically obtained by the control unit and which is proportional to the actual emission or to the actual conversion. The control unit then determines the deviation between these values, and, as a function of this deviation, determines a correction value for the metered quantity. The control unit then modifies the stored model by this correction value for subsequent metering processes.

The model continues to be modified by the correction value until the control unit determines a deviation between a value which has been determined for the internal combustion engine and/or the exhaust gas post-treatment system by the control unit of the internal combustion engine from stored values, namely, a value which is proportional to the nominal emission or to the nominal conversion, and a value which has been newly determined metrologically by the control unit and which is proportional to the actual emission or to the actual conversion. As a function of this deviation, the control unit then determines a new correction value for the metered quantity. The stored model is then modified by this new correction value for subsequent metering processes.

To obtain the actual emission value or the actual conversion of an internal combustion engine with a downstream exhaust gas post-treatment system, a certain amount of time is required, over which the signal of an $NO_x$ sensor and/or of an $NH_3$ sensor and/or of an $N_2O$ sensor is added up or integrated. The operating conditions, furthermore, should change as little as possible during this process. This in itself has limited the determination of actual emission values or actual conversions to steady-state operating conditions. To obtain independence from steady-state operating conditions for the determination of the correction value in an advantageous manner, the determination of the actual emission or of the actual conversion is carried out according to the inventive method in that the control unit adds up or integrates the measurement value of an $NO_x$ sensor and/or of an $NH_3$ sensor and/or of an $N_2O$ sensor installed downstream of the SCR catalyst and simultaneously monitors the results to determine whether or not the at least one operating parameter lies within one of at least two different value ranges, wherein the value ranges are determined by values stored in the control unit. The addition or integration can continue for a predefined time t or until a predefined emission quantity is reached or until the adding-up or integration of at least one operating parameter has reached a predefined value. This operating parameter can be, for example, the quantity of exhaust gas and/or quantity of fuel and/or the quantity of reducing agent and/or the work performed by the internal combustion engine. To determine the period of time over which the addition or integration is conducted, furthermore, it is also possible to use the operating parameter selected to monitor the value ranges. Of course, in order to obtain nominal and actual conversions, it is also necessary to determine the raw emissions.

To determine whether or not the quantity of emissions has been reached, it is possible to add up or to integrate concentration values and/or emission masses and/or emission mass flows.

Through above-mentioned assignment of value ranges within which the at least one operating parameter may vary during the addition or integration process, i.e., through the formation of classes, the frequency at which actual emission values or actual conversions and thus correction values can be obtained for the metering of the reducing agent can be significantly increased. Though the choice of the value ranges within which the at least one operating parameter may move, the error resulting from this class formation can be kept within a negligible order of magnitude.

If the at least one operating parameter leaves the actual value range, i.e., the class, during the addition or integration process, there are two alternative approaches which can be taken. According to a first approach, the sum found by addition or integration can be discarded when the control unit determines that the parameter has left the actual value range. According to a second approach, the control unit can store the sum obtained by addition or integration on an interim basis when it finds that the parameter has left the actual value range. Then, when the control unit determines that the parameter has returned to the value range it had previously left, it can resume the addition or integration process until a predefined emission quantity or amount of work performed is reached, until a sum or integral of another operating parameter is reached, or until the predefined time t for addition or integration has passed.

Both alternatives have their advantages and disadvantages. In the first case, a correction value determination occurs "at one go", i.e., only seconds lie between the beginning and end of the process. In such short time periods, time-related influences or environmental influences do not play any role and therefore have no effect on the determination of the correction value. On the other hand, the frequency at which actual correction values are made available is significantly decreased. In the second case, it is possible, at least theoretically, for days or even weeks to go by until the process of determining the actual emission is completed, as a result of which time-related influences or environmental influences can quite easily exert their effects, which could falsify the measurement result. This can be countered by limiting the period of time during which interim stored values are considered valid. When the method making use of interim storage is used, it as advantageous that the frequency at which the actual emission values and thus the actual correction values are made available is greatly increased.

In the next phase of the method, the control unit uses, as the actual emission for comparison with the stored nominal emission, the sum or a value proportional to it obtained by addition or integration over the predefined time t or until the predefined emission quantity or amount of work performed is reached, or until the sum or integral of some other operating parameter is reached and then determines, on the basis of the observed difference, a correction value for the metered quantity. The actual correction values valid at the time in question for a value range of the at least one operating parameter are kept available in the control unit, so that the control unit can access them to modify the metered quantity based on the model by the correction value determined for the value range in question of the at least one operating parameter when the actual value of the at least one operating parameter determined by the control unit lies in the corresponding value range.

The model for determining the metered quantity can thus be adjusted efficiently and therefore advantageously to changes over time and to changes in the environmental conditions.

As an alternative, the control unit, as a function of the actual value of the at least one operating parameter determined by the control unit, can determine by interpolation an intermediate value as the correction value from correction values which were determined for the values of the at least one operating parameter immediately adjacent to this actual value. In this way, it is possible to decrease the error caused by the formation of classes, because intermediate values, i.e., values intermediate to the stored correction values, can be formed for each operating point, whereas at the same time it is possible by interpolation to bridge over value ranges for which no correction value has yet been determined An especially simple and thus advantageous method for determining the nominal emission or the nominal conversion from the model consists in using the control unit to add up or to integrate the values for the nominal emission or the nominal conversion obtained from the model as a function of the operating point over the predefined time t or until a predefined emission quantity or amount of work performed is reached or until a sum or integral of some other operating parameter is reached—this being done parallel in time to the determination of the actual emission or the actual conversion, whereupon the control unit uses the sum or a value proportional to it thus obtained as the nominal emission or nominal conversion for the comparison between the actual emission or the actual conversion and the nominal emission or the nominal conversion.

An advantage of this procedure is that, with the exception of the operating parameter for which the correction value is to be determined and which therefore may move only in the assigned value range, i.e., within the class, all other operating parameters may take on any possible value, because the resulting effects are eliminated by the addition or integration of the actual emissions and nominal emissions. In other words, both the determination of the actual emission or of the actual conversion and the determination of the nominal emission or nominal conversion involve passage though the same operating points, so that the resulting influences cancel each other out when the two values are compared, and as a result only the deviation relative to the operating parameter for which the correction value is to be determined remains.

To modify the metered quantity determined from the models by the correction value in cases where the correction value is stored in the form of a positive or negative metered quantity correction, the control unit forms the sum of the metered quantity plus the correction value, or, in cases where the correction is stored as a factor, the control unit forms the product of the metered quantity times the correction value.

The operating parameter of the internal combustion engine or of the exhaust gas post-treatment system evaluated by the control unit can be the cooling water temperature and/or the oil temperature and/or the fuel temperature and/or the fuel injection pressure and/or the intake air temperature and/or the charging air temperature and/or the turbocharger rpm's and/or the charging pressure and/or the driving speed and/or the engine rpm's and/or the quantity of fuel injected and/or the exhaust gas temperatures and/or the catalyst temperature and/or the quantity of reducing agent injected and/or the exhaust gas return rate and/or the reducing agent pressure and/or the emissions and/or the fuel/air ratio and/or the change over time in these variables.

What this means for the metering of the reducing agent is that, in the simplest case, i.e., the case in which only one operating parameter, e.g., the exhaust gas mass flow, is evaluated by the control unit, the model available in the control unit would contain only one characteristic curve. If several operating parameters are evaluated by the control unit, one or more characteristic diagrams or one or more multi-parametric functions will be used.

Because of the numerous operating parameters which can exert an influence on the metered quantity of reducing agent, it is effective for the control unit to determine and to store different correction values and/or different parameters of at least one correction function and/or to determine and to store several correction functions for different operating parameters of the internal combustion engine and/or of the exhaust gas post-treatment system, and for the control unit, as a function of the actual operating point of the internal combustion engine and/or exhaust gas post-treatment system, to use these correction values and/or correction functions to determine a correction value relating to the operating point.

The above-described multiple dependence makes the importance of the class assignment of the operating parameters especially clear, because in this way is it possible to determine multiply dependent correction values in an acceptable period of time. Class formation has the effect that operating parameter ranges are held constant within limits, which are defined in each case, so that, as a result, an operating point range is obtained which can be treated as if steady-state operating conditions were present. The formation of classes as previously described increases very significantly the probability that the real operating point at which the internal combustion engine and/or the exhaust gas post-treatment system is operating at that moment will be at an operating point which can be treated as if steady-state conditions are present long enough to allow the determination of the correction value.

As sensors for determining the actual emissions, the raw emissions, and the actual conversions, it is possible to use HNCO sensors and/or $N_2O$ sensors and/or $NO_x$ sensors and/or $NH_3$ sensors and/or lambda sensors. These sensors are commercially obtainable, and their design therefore requires no further explanation.

DETAILED DESCRIPTION OF THE PRESENTLY PREFERRED EMBODIMENTS

In the following, the invention is explained in greater detail on the basis of the exemplary embodiments.

The following discussion is based on an exhaust gas post-treatment system for metering an ammonia-releasing reducing agent into the exhaust gas stream of an internal combustion engine installed in a vehicle and operated with excess air.

As previously shown, metering the reducing agent in a controlled manner as a function of an operating point is not an adequate solution for systems of this type. On the contrary, it is necessary to correct the metered quantity as a function of the changes over time in the exhaust gas post-treatment system or in the internal combustion engine and as a function of environmental influences. For this purpose, operating point-dependent correction values are determined.

The way in which a correction value is to be determined in relation to the associated operating point of the internal combustion engine and/or of the exhaust gas post-treatment system will be explained below by way of example. It is assumed that the sequences of steps described below are realized as programmed control sequences in a control unit, e.g., a programmable, electronic engine control unit as used in modern internal combustion engines. The control unit is connected to the internal combustion engine and to the exhaust gas post-treatment system by a large number of sensors, and by means of these sensors it determines all of the actual values of the relevant operating parameters of the internal combustion engine and of the exhaust gas post-treatment system and also the current actual emission values or current actual conversions of the exhaust gas post-treatment system. The actual values of the relevant operating parameters define the actual operating point of the internal combustion engine and of the exhaust gas post-treatment system.

First, the relevant operating parameters are continuously monitored during the operation of the internal combustion engine. This is done so that the metered quantity of reducing agent can be taken from the model stored in the control unit as a function of the operating point. The operating parameters are also monitored so that correction values for the reducing agent quantity, which is kept available as a stored value as a function of the operating point, can be determined as a function of the operating parameter values. How the correction values are determined is discussed in detail below.

As previously explained, the correction values are determined on the basis of classes. This means that the values which the relevant operating parameters can assume are divided into value ranges or classes. For each relevant operating parameter, at least two value ranges or classes are defined. How many classes exist for an operating parameter or how the classes are set up, i.e., what starting value and what ending value they have, depends on the value ranges of the corresponding operating parameter in which the correction value changes to only a negligible extent. The corresponding value ranges were determined by the use of a reference system. The reference system, as already discussed, consists of an exhaust gas post-treatment system for metering an ammonia-releasing reducing agent into the exhaust gas stream of an internal combustion engine which is installed in a motor vehicle and operated with excess air and which corresponds to the production model of the series in question and on which the corresponding measurements have been made by series of experiments. The value ranges or classes thus obtained for each of the relevant operating parameters are stored in the control units of the production model series, so that they are available for later use.

During the operation of a system according to current series production and under the assumption that there are no correction values present in the control unit at this initial point, e.g., at the time when the internal combustion engine is first put into service, the metering process is carried out on the basis of the metered quantities available from the model, that is, based on uncorrected values. At the same time, the control unit begins to retrieve the current values of the relevant operating parameters in cycles and to compare them with the values ranges or classes that are stored in the control unit. As a function of the result of this comparison, there are two possibilities:

i) The actual value of the operating parameter remains within the limits of a class.

ii) The actual value of the operating parameter goes beyond the limits of the class.

The two cases just listed are discussed in greater detail below.

A second process takes place in parallel with the one just described. Namely, the value supplied by an exhaust gas sensor or the conversion determined by means of this sensor is added up or integrated by the control unit for the current class or classes in which the operating parameter or parameters are located. A time t, an emission quantity, an amount of work performed by the internal combustion engine, or the sum or the integral of some other operating parameter can be specified in the control unit as an end point for the addition or integration process. When the end point in question is reached—under the assumption that the value or values being added or integrated do not leave the class or classes before the end point has been reached—the control unit finishes the addition or integration process and uses the value thus obtained as an equivalent to the actual emission or to the actual conversion of the system for an actual-versus-nominal comparison.

The predefined time t should be at least 15 seconds. In the case that, instead of the time t, a predefined emission quantity serves as the termination criterion, the emission quantity, as previously mentioned, can be determined by addition or integration of concentration values and/or emission masses and/or emission mass flows.

If the predefined emission quantity is expressed in units of mass by addition or integration of emission masses and/or emission mass flows, the predefined emission quantity for $NO_x$ should be at least 1 mg and/or the predefined emission quantity for $NH_3$ should be at least 0.01 mg and/or the predefined emission quantity for $N_2O$ should be at least 0.02 mg and/or the predefined emission quantity for HNCO should be at least 0.01 mg.

The value for the nominal emission or for the nominal conversion can be determined by falling back on the stored values, which are analogous to the actual emission values determined by the control unit but which were obtained by theoretical considerations and/or by experiment with the help of the reference internal combustion engine in a preceding process and which have also been stored in the memory of the control unit, linked to the metered quantities also stored there. In analogy to the addition or integration of the value for the actual emission or for the actual conversion, such stored values can also be added or integrated over the predefined time t or alternatively until the predefined emission quantity, amount of work performed, or sum or the integral of some other operating parameter is reached, so that the value thus obtained is proportional to the nominal emission.

If the actual value or values of the operating parameter or parameters go outside the class limit, as mentioned above as the second possibility, there exist again two possibilities for proceeding. First, the partial sum or partial integral already obtained can be discarded, so that no correction value or no new correction value is formed. Second, it is possible to interrupt the addition or integration process when the class limit is exceeded and, when the values return to the class, to resume the process again at the point where it was interrupted. The predefined time t or alternatively the predefined emission quantity, the predefined amount of work performed, or a predefined sum or integral of some other operating parameter which is intended for the addition or integration process is thus subdivided into partial times $t_x$ or partial emission quantities, partial amounts of work, or partial sums or partial integrals of some other operating parameter.

The operating parameters (e.g., temperature of the oil, of the exhaust, or of the engine coolant, and the outside temperature) that are to be taken into consideration during the determination of the actual emission depend on the conditions at the time in question. In practice, only a few of the theoretically possible parameters listed above will be taken into consideration.

Once the deviation between the nominal emission and the actual emission or between the nominal conversion and the actual conversion is determined, a correction value can be obtained from that, and this value can be linked to the operating parameter class or classes in question and stored in the memory of the control unit.

Now that correction values are present in the control unit, the metered quantity is corrected as a function of these correction values, which are associated with the operating parameter classes. To do this, the control unit takes the metered quantity which has been kept available as part of the model stored in it and which has been called up as a function of the current operating point from the memory and links it with the one or more correction values.

The following general statements can be formulated with respect to the explanations given above:

For n operating parameters, referred to in the following as "parameters of influence E", at least 2n correction values and/or at least one correction function $k_f$ with n parameters must be determined.

The actually supplied quantity of the reducing agent $m_{reducing\ agent}$ at time t is then obtained from a reducing agent quantity $m_{reducing\ agent,\ model}$ determined from stored data in the form of curves, characteristic diagrams, tables, or functions and at least one correction value K, linked with at last one parameter of influence E. This correction value depends on the actual value of the parameter of influence E and the correction value $k_f$ determined at time t' and linked to the parameter of influence E, wherein the correction value $k_f$, as previously described, was determined on the basis of classes.

In general, we can write:

$$m_{reducing\ agent}(t) = K(E(t), k_f(t')) \cdot m_{reducing\ agent,\ model},$$

wherein t is the current time and t' is a time in the past.

In addition to multiplication, it is also possible, of course, to use addition according to:

$$m_{reducing\ agent}(t) = K(E(t)) + m_{reducing\ agent,\ model}.$$

To determine the effect of different values of the parameter of influence, it is necessary to find the deviation between the nominal and the actual emissions or between the nominal and the actual conversions in at least two different value ranges for the parameter of influence E and thus at two different times in the past.

Here is an example: First, in a preceding process, the operating parameters are divided into classes as described above. The correction values for each class are then determined by integration or addition of actual values within the classes and by comparison with the nominal value. For this, a certain measurement time t must be specified, which is necessary for determining a reliable correction value.

By way of example, the method of operating parameter classes or parameter of influence classes is described below on the basis of the parameter of influence "exhaust gas mass flow".

When the actual value during operation is compared with the nominal value, at 100-1,000 kg/h, a correction value of 120% is determined at time t';
at 1,001-2,000 kg/h, a correction value of 90% is obtained at time t''; and
at 2,001-3,000 kg/h, a correction value of 130% is obtained at time t'''.

The correction values thus obtained are plotted in the form of a characteristic curve and assigned to the exhaust gas mass flow classes 100-1,000 kg/h, 1,000-2,000 kg/h, and 2,000-3,000 kg/h.

| exhaust gas mass flow classes (kg/h): | 100-1,000 | 1,001-2,000 | 2001-3000 |
|---|---|---|---|
| correction value, (%) | 120 | 90 | 130 |

The correction value is thus linked to a class of a parameter of influence and no longer to a single value of a parameter of influence.

During operation of the engine under non-steady-state conditions, the correction value which has been determined can then apply either to the entire span of the class or to only a single value of the class such as the lower limit, the middle, or the upper limit, wherein the actual correction value is then determined—advantageously by linear interpolation—from the characteristic curve and used to adjust the controlled metered quantity. In the former case, a constant correction value of 90%, by which the metered quantity determined from the models would be corrected by multiplication by the correction value, would be obtained for a mass flow in the range of 1,001-2,000 kg/h, and it would be corrected by 130% starting at 2,001 kg/h. In the latter case, a correction value of 102% would be obtained for an exhaust gas mass flow of 1,800 kg/h by linear interpolation, under the assumption that the correction value is related to the center of each of the two nearest correction classes.

The correction values, as described above, can be determined and stored in the form of relative values or in the form of absolute values, such as for example, changed quantities of reducing agent. The example given below is intended to illustrate the difference, wherein, for the sake of simplicity, the deviations have been taken over directly as correction values for both the relative correction values and the absolute correction values. In reality, however, it is more effective to limit the maximum values and/or the permitted change of the correction values per inspection in order to prevent the system from oscillating.

As already described above, the relative correction values for the parameter of influence "exhaust gas mass flow" are to be determined, wherein the $NO_x$ conversion is used as an evaluation criterion.

| exhaust gas mass flow classes (kg/h) | 100-1,000 | 1,001-2,000 | 2,001-3,000 |
|---|---|---|---|
| nominal $NO_x$ conversion (%) | 90 | 80 | 65 |
| actual $NO_x$ conversion (%) | 75 | 89 | 46.2 |
| correction value (%) | 120 | 90 | 130 |

If absolute values are used, it is more effective, when $NO_x$ sensors are being used, to use the $NO_x$ concentration downstream of the SCR system as the evaluation criterion.

| exhaust gas mass flow classes (kg/h) | 100-1,000 | 1,001-2,000 | 2,001-3,000 |
|---|---|---|---|
| nominal $NO_x$ conversion (ppm) | 800 | 1,200 | 650 |
| actual $NO_x$ conversion (ppm) | 650 | 1,400 | 650 |
| correction value (ppm) | 150 | −200 | 0 |

In determining the quantity of reducing agent $m_{reducing\ agent}(t)$ at a later time, it is important to remember, when absolute correction values $k_f$ are being used, that the correction values must stand for metered quantities of reducing agent. That is, in the above example, the concentration value determined from the correction values with the help of the actual exhaust gas quantity must be converted to an actual addition to the metered quantity of reducing agent. This can be avoided by storing the reducing agent quantities themselves as correction values instead of the exhaust gas concentrations.

To determine correction values for the other parameters of influence such as the cooling water temperature and/or the oil temperature and/or the fuel temperature and/or the exhaust gas mass flow and/or the fuel injection pressure and/or the intake air temperature and/or the charging air temperature and/or the turbocharger rpm's and/or the charging pressure and/or the driving speed and/or the engine rpm's and/or the quantity of fuel injected and/or the exhaust gas temperatures and/or the catalyst temperature and/or the quantity of reducing agent injected and/or the exhaust gas return rate and/or the reducing agent pressure and/or the raw $NO_x$ emissions and/or the number of hours of operation and/or the humidity and/or the atmospheric pressure, it is possible to proceed in a manner similar that described for the examples given above.

If n parameters of influence $E_1$ to $E_n$ are obtained, then, for n correction values, the actually added metered quantity can be determined by, for example, multiplication:

$$m_{reducing\ agent}(t)=K_1(E_1(t),k_{f1}(t'))\cdot K_2(E_2(t),k_{f2}(t''))\cdot K_3(E_3(t),k_{f3}(t'''))\cdot \ldots K_n(E_n(t),k_{fn}(t''''))) \cdot m_{reducing\ agent,\ model}$$

or by addition:

$$m_{reducing\ agent}(t)=K_1E_1(t),k_{f1}(t'))+K_2(E_2(t),k_{f2}(t''))+K_3(E_3(t),k_{f3}(t'''))+ \ldots K_n(E_n(t),k_{fn}(t''''))) + m_{reducing\ agent,\ model}$$

of the correction values.

Addition of the correction values is usually done when the correction values are absolute values. Multiplication is usually done when the correction values contain relative values.

Another possibility is to set up a multi-parameter correction function K, in which the parameters of influence $E_1$ to $E_n$, are contained:

$$m_{reducing\ agent}(t)=K(E_1(t),k_{f1}(t'),E_2(t),k_{f2}(t''),E_3(t),k_{f3}(t''')+ \ldots E_n(t),k_{fn}(t''''))\cdot m_{reducing\ agent,\ model}.$$

The individual correction values for the parameters of influence can have been, but do no have to have been, determined at different times t', t'', t''', etc.

The correction values continue to be kept "frozen", i.e., stored without change and used to correct the stored values and thus the control process until the value of the parameter returns to the operating parameter class in question and/or a new integration or addition has been completed, as a result of which a new inspection of the emissions can be conducted and new correction values can be determined.

In the preceding examples, the deviation between the nominal value and the actual value was adopted as a control value on a one-to-one basis. This does not always lead to the goal. In cases where the deviations are large, large correction values are obtained, which can lead to an upswing of the system. It is therefore effective to limit the change in the correction values per inspection step. This can be achieved by specifying a maximum permissible change in the correction value per inspection step and/or by specifying a minimum and/or maximum correction value. Another possibility is to determine the correction value by multiplying the correction value by a value between zero and one.

In cases where several correction values are determined for several operating parameters or parameters of influence, it must be kept in mind that the different parameters of influence exert different degrees of influence on the actual emissions or actual conversions. It is therefore effective to realize the influence of the individual parameter of influence-dependent factors leading to the correction of the metered quantity by weighting factors $w_1$, $w_2$, $w_3$, $w_n$ for the individual correction values. This leads, for example, to the following equation:

$$m_{reducing\ agent}(t)=(w_1\cdot K_1(E_1(t),k_{f1}(t'))+(w_2\cdot K_2(E_2(t),k_{f2}(t''))+(w_3\cdot K_3(E_3(t),k_{f3}(t'''))+ \ldots (w_n\cdot K_n(E_n(t),k_{fn}(t''''))) \cdot m_{reducing\ agent,\ model}(t)$$

Especially in the determination of the metered quantity by multiplication and/or by the setting up of a multi-parametric correction function, it is also conceivable that the degree of influence of the different parameters of influence could be taken into account right when the individual correction values are determined, so that, for parameters of lesser influence, the correction values would be smaller than those for parameters of greater influence. It is also conceivable that, for different parameters of influence, different maximum permissible correction value changes per inspection step and/or different minimum and/or maximum correction values could be introduced. Another possibility consists in determining the different correction values by multiplication by different weighting factors between zero and one, which thus represent the degree of influence of the individual parameters of influence. In the simplest case, the weighting factors can be defined as constants. Another possibility consists in determining the weighting factors by means of a function and/or a characteristic diagram and/or a characteristic curve, which is also dependent on the value of at least one operating parameter or parameter of influence and/or on the deviation between the nominal and the actual emissions or conversions. Because the degree of influence of a parameter of influence can change during the course of operation, e.g., as a result of the aging of the catalyst, it is also conceivable that the weighting factors could be adjusted over the course of the operating life. This can be done by, for example, making the weighting factor dependent on the number of changes that have been made to the associated correction value and/or on the size of the change in the correction value. It also possible to use at least one neuronal network to weight the correction values and/or to determine the correction values as a function of at least one parameter of influence.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps that perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A method for metering an ammonia-releasing reducing agent into an exhaust gas stream of an internal combustion engine operating with excess air in an exhaust gas post-treatment system having at least one SCR catalyst arranged in the exhaust gas stream downstream of a metering device, comprising:

metering the ammonia-releasing reducing agent into the exhaust gas stream by the metering device that is controlled by a control unit assigned to the exhaust gas post-treatment system, wherein the metered quantity of reducing agent is determined by the control unit based on a model that covers a plurality of operating points of one of the internal combustion engine and the exhaust gas post-treatment system as a function of at least one operating parameter of the one of the internal combustion engine and the exhaust gas post-treatment system evaluated by the control unit, wherein an instantaneous value of the at least one operating parameter determines an associated one of the plurality of operating points of the one of the internal combustion engine and the exhaust gas post-treatment system;

comparing by the control unit, during operation of the internal combustion engine, a first stored value, which is proportional to one of a nominal emission and a nominal conversion determined for the one of the internal combustion engine and the exhaust gas post-treatment system, with a second value, metrologically obtained, that is proportional to one of an actual emission and an actual conversion;

determining a deviation between the first and second value;

determining a correction value for the metered quantity based at least in part on the determined deviation;

modifying the model by the correction value for the metered quantity for a subsequent metering processes, the modified model being used until another deviation between a value which has been stored for the associated operating point of the one of the internal combustion engine and the exhaust gas post-treatment system that is proportional to the nominal emission or to the nominal conversion and a value which has been newly determined metrologically by the control unit and which is proportional to the actual emission or to the actual conversion;

determining at least one of:

the one of the actual emission and the actual conversion by one of adding and integrating a measurement value of at least one of an NOx sensor, an $NH_3$ sensor, an $N_2O$ sensor, an HNCO sensor, and a lambda sensor installed downstream of the SCR catalyst, and the actual conversion by one of adding and integrating a measurement value of at least one of the NOx sensor, the $NH_3$ sensor, the $N_2O$ sensor, the HNCO sensor, and the lambda sensor and a raw emission upstream of the SCR catalyst, one of for a predefined time, until a predefined emission quantity or amount of work is reached, and until at least one of the said at least one operating parameter reaches a predefined value by addition or integration;

monitoring the results of the determining to further determine whether or not the at least one operating parameter lies within one of at least two different value ranges, wherein the value ranges are determined by stored values;

at least one of:

discarding the result of the addition or integration when the at least one operating parameter has left the value range during the addition or integration process; and storing the sum obtained by addition or integration on an interim basis and then, when the control unit determines that the at least one operating parameter has returned to the value range it had previously left, resuming the addition or integration process until the one of the predefined time for addition or integration has passed, until the predefined emission quantity or amount of work is reached, and until the at least one operating parameter has reached the predefined value by addition or integration;

using, by the control unit, the sum obtained by addition or integration over the predefined time or until the predefined emission quantity or amount of predefined work is reached or a value proportional to that sum as the actual emission or actual conversion, for comparison with the nominal emission or nominal conversion obtained from the stored values, to determine the correction value for the metered quantity; and one of:

modifying the metered quantity from the model by the correction value determined for the associated value range of the at least one operating parameter, when the value of the at least one operating parameter determined by the control unit lies in this value range; and determining, by the control unit, as a function of the value of the at least one operating parameter determined by the control unit, by interpolation, a correction value from correction values which were determined for values of the at least one operating parameter immediately adjacent to the value and modifying the metered quantity from the model by this determined correction value.

2. The method according to claim 1, wherein, in parallel with the determination of the one of the actual emission and the actual conversion, the control unit, by adding up or integrating one of ideal emission values and ideal conversions stored in association with the plurality of operating points, determines one of the nominal emission and the nominal conversion for the plurality of operating points through which the one of the internal combustion engine and the exhaust gas post-treatment system has passed during one of the predefined time, until the predefined emission quantity or amount of work has been reached, until the predefined value has been reached by addition or integration of at least one operating parameter, whereupon the control unit uses the sum thus obtained or a value proportional to it as the nominal emission or nominal conversion for comparison with the actual emission or actual conversion.

3. The method according to claim 1, wherein the metered quantity determined from the model is linked by the control unit with the correction value by one of multiplication and addition.

4. The method according to claim 1, wherein the at least one operating parameter of the internal combustion engine and the exhaust gas post-treatment system evaluated by the control unit is at least one of a cooling water temperature, an oil temperature, a fuel temperature, a fuel injection pressure, an intake air temperature, a charging air temperature, a turbocharger's rpms, a charging pressure, a driving speed, an engine's rpms, a quantity of fuel injected, an exhaust gas temperature, a catalyst temperature, a quantity of reducing agent injected, an exhaust gas return rate, an ammonia-releasing reducing agent pressure, an emissions, a fuel/air ratio, and a change over time of the at least one operating parameter.

5. The method according to claim 1, further comprising determining and storing at least one of different correction values and different parameters of at least one correction function for different ones of the at least one operating parameter of the one of the internal combustion engine and the exhaust gas post-treatment system; and determining, by the control unit, the correction value for the metered quantity related to an actual operating point from at least one of the different correction values and the correction functions as a function of the actual operating point.

6. The method according to claim 1, wherein the predefined time is at least 15 seconds.

7. The method according to claim 1, wherein the predefined emission quantity is determined by one of addition and integration of at least one of concentration values, emission masses, and emission mass flows.

8. The method according to claim 7, wherein the predefined emission quantity is stored as units of mass, and the emission masses and emission mass flows reach the predefined emission quantity by a process of addition or integration, wherein the predefined emission quantity for $NO_x$ is at least 1 mg, the predefined emission quantity for $NH_3$ is at least 0.01 mg, the predefined emission quantity for $N_2O$ is at least 0.02 mg, and the predefined emission quantity for HNCO is at least 0.01 mg.

9. The method according to claim 1, wherein the at least one operating parameter used for the determination of the duration of the one of the integration and addition of the nominal and actual values are the at least one operating parameter whose value ranges are inspected or which are used for the determination of the correction value.

10. The method according to claim 1, wherein the at least one operating parameter used for the determination of the duration of the integration or addition of the nominal and actual values are different from the at least one operating parameter whose value ranges are inspected or which are used for the determination of the correction value.

11. The method according to claim 1, wherein the at least one operating parameter used for the determination of the duration of the integration or addition of the nominal and actual values include at least one of the exhaust gas quantity, the fuel quantity, the ammonia-releasing reducing agent quantity, and the work performed by the internal combustion engine.

\* \* \* \* \*